United States Patent [19]

Rogers

[11] Patent Number: 4,833,932

[45] Date of Patent: May 30, 1989

[54] STABILISED MOUNT

[75] Inventor: Neville Rogers, Essex, England

[73] Assignee: The General Electric Company, p.l.c., London, United Kingdom

[21] Appl. No.: 70,372

[22] Filed: Jun. 30, 1987

[30] Foreign Application Priority Data

Jul. 12, 1986 [GB] United Kingdom ............... 8617025

[51] Int. Cl.$^4$ .............................................. G01C 19/26
[52] U.S. Cl. ........................................ 74/5.1; 74/5.34; 343/765
[58] Field of Search ................. 74/5.1, 5.2, 5.12, 5.14, 74/5.34, 5.22; 343/765

[56] References Cited

U.S. PATENT DOCUMENTS 2,907,212 10/1959 Garnier .................................. 74/5.1
4,399,714 8/1983 Barker .................................. 74/5.1

Primary Examiner—Rodney H. Bonck
Attorney, Agent, or Firm—Lowe, Price, LeBlanc, Becker & Shur

[57] ABSTRACT

A stabilised mount (e.g. for an antenna) has two gyroscopic rotors mounted in such a way that they can pivot about orthogonal axes. Rewinding of the antenna (to avoid undue twisting of the electrical cables) is liable to cause a voilent destabilisation of the mount because of the gyroscopic action of the rotors. To prevent this destabilisation the rotors are locked against the aforementioned pivoting action during the rewinding procedure.

2 Claims, 3 Drawing Sheets

STABILISED MOUNT

FIELD OF THE INVENTION

This invention relates to a stabilised mount, e.g. for an antenna, camera, optical sensor or other surveillance apparatus. It was designed in connection with an antenna for use on a ship as part of a satellite communications system. It will be understood that it is necessary to isolate such an antenna from the effects of the pitch and roll of the ship.

DESCRIPTION OF THE PRIOR ART

One conventional method of stabilisation is to fix two spinning rotors to a platform carrying the antenna. The rotors produce a gyroscopic effect and are allowed to pivot freely about respective orthogonal axes. The effect of the rotors is to provide a restoring torque equal and opposite to that tending to destabilise the platform.

Experience has shown that the inclusion of slip rings and rotating joints in electrical connections between the antenna and ship is likely to result in reduced reliability, increased cost and undesirable signal loss. For these reasons continuous electrical links having sufficient flexibility to accommodate rotation about more than 360° are considered preferable in many circumstances. A problem associated with the use of such continuous electrical links is that, during the course of a voyage, the ship may turn through more than the maximum angle which can be accommodated by the flexibility of the links. It is therefore necessary to provide some form of detector to detect when the electrical links are twisted to their limits; and to provide some mechanism for "rewinding" the platform (i.e. rotating it about the azimuth axis through 360°) when such a detection is made. During this "rewinding" process gyroscopic action causes the rotors to pivot about their aforementioned orthogonal axes until they reach end stops (normally after pivotting through about 45°) whereupon the rotors cause a violent destabilisation of the platform; exactly the opposite effect of what is desired. Because of this violent destabilisation it may take a long while to regain a condition where the antenna is correctly tracking the satellite.

One known method of overcoming this problem is to effect the rewinding by rotating the antenna relative to the platform so that the rotors are not themselves affected by the rewinding process. This requires the provision of an expensive bearing sub assembly between the antenna and the platform. Another known method is to mount the rotor units on special bearings allowing the rotor units to rotate about axes parallel to the axis of rewind; and to provide a chain drive system so that the orientations of the rotor units are not changed during rewinding. This likewise involves additional expense.

BRIEF SUMMARY OF THE INVENTION

This invention provides a stabilised mount for an antenna comprising: a platform adapted to carry the antenna; a universal joint by which the platform is adapted to be mounted on a vehicle; means allowing the platform to be rotated about a first axis relative to the vehicle and the antenna to be rotated about a second axis relative to the platform so that the antenna is adjustable in azimuth and elevation; stabilisation rotors which rotate about third axes and are mounted on the platform in a manner such that they are allowed to pivot about the fourth and fifth orthogonal axes; means for detecting when the platform has rotated about the first axis relative to the vehicle to a certain limit; and locking means which respond to such a detection by locking the rotors at positions of rotation about the said fourth and fifth axes such that the third axes are parallel to the first axis.

By locking the rotors in this way it is possible to carry out the rewinding operation without causing the violent destabilisation previously referred to. The rewinding can be performed automatically either directly or indirectly in response to the aforementioned "detection." Where the rewind is initiated automatically it must be done in such a way as to ensure that rewinding is not commenced until after the locking means has locked the rotors.

In a preferred form of the invention the locking means includes a detent mechanism associated with the rotors and which engages to prevent rotation about the fourth and fifth axes when movement of the vehicle has caused the third axis to be parallel to the first axis. The rewinding operation can be commenced at a predetermined time after a "detection" sufficient to ensure engagement of the detent. Alternatively engagement of the detent can be arranged to produce a signal which initiates rewind.

One way in which the invention may be performed will now be described by way of example with reference to the accompanying drawings in which:

DETAILED DESCRIPTION

Figure 1:
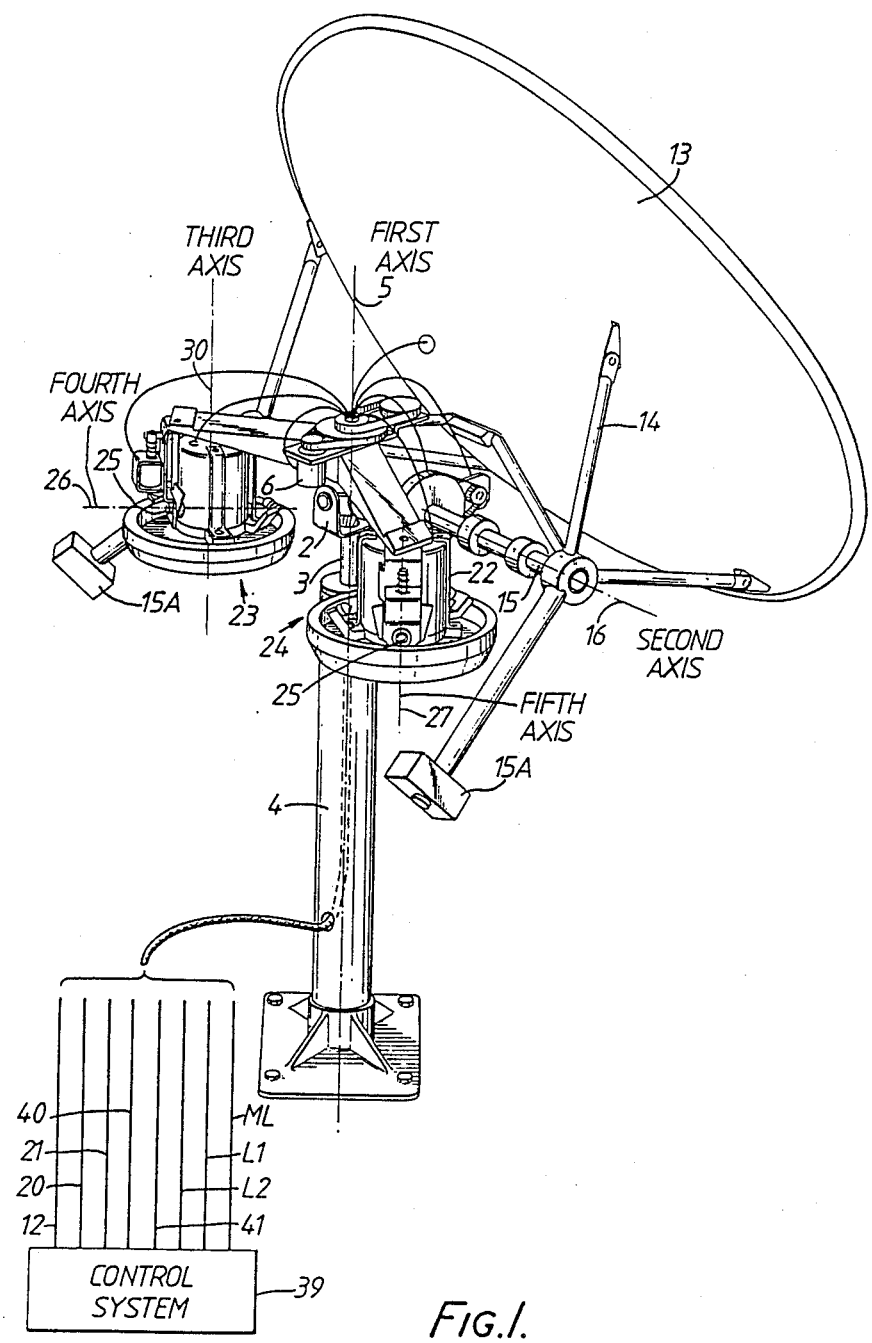
FIG. 1 is a perspective view of a stabilised mount constructed in accordance with the invention and carrying an antenna.
Figure 1A:
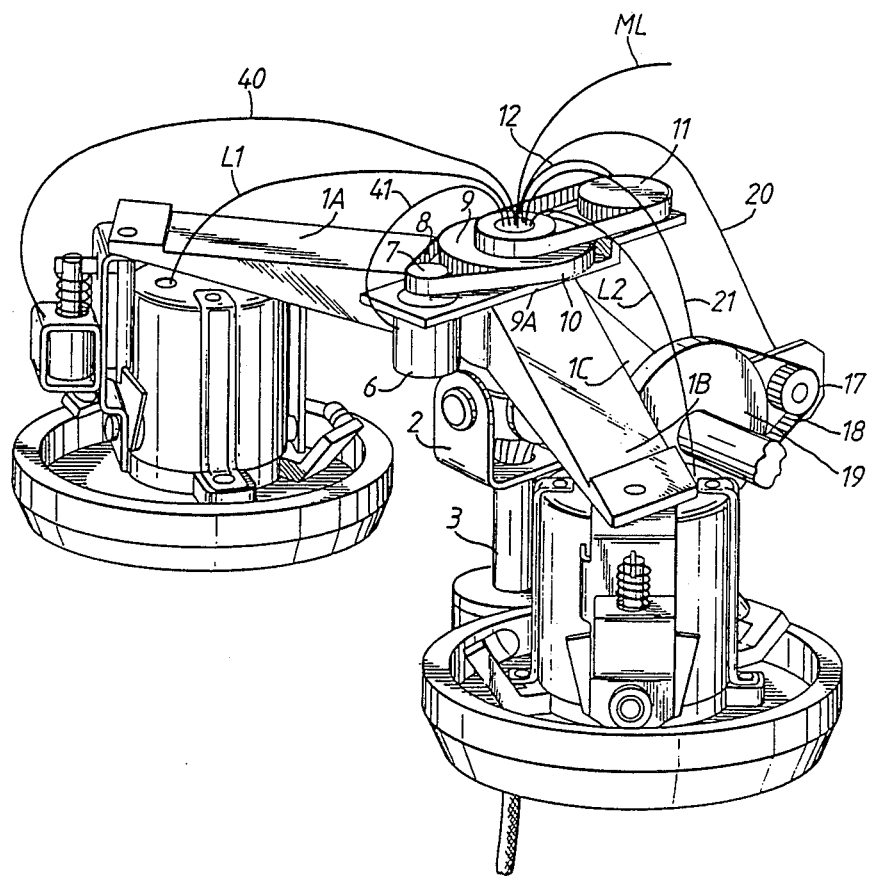
FIG. 1A is an enlarged view of a platform and associated parts also shown in FIG. 1.

Referring firstly to FIGS. 1 and 1A, there is shown a platform comprising three arms 1A,1B,1C mounted by a universal joint 2 to a shaft 3 which is free to move up and down in a pedestal 4 and is keyed to prevent rotation therein. A spring (not shown) in a pedestal 4 provides a shock absorbing action. The pedestal 4 is attached to a ship (also not shown). It is pointed out however that the apparatus could be used on other vehicles for use on land, in the air or in space.

Between the universal joint 2 and platform 1A,1B,1C is a bearing (not shown) allowing the platform to rotate about a first axis 5 which is shown vertical in FIG. 1.

The platform 1A,1B,1C is arranged to be driven in azimuth about axis 5 by a motor 6, pulley 7 drive belt 8 and a pulley 9, the latter being attached to the platform. The pulley 9 is also attached to a smaller pulley 9A which drives a belt 10 and thence a pulley 11. The latter is part of a potentiometer device which produces an output signal on line 12 indicating the current azimuth of the antenna.

The centre of gravity of the platform 1 and all the components attached to it is directly below the universal joint. This provides a vertical reference and tends to maintain the platform horizontal.

An antenna reflector 13 is mounted on a frame 14 which includes a shaft 15 journaled in the arm 1C of the platform for rotation about a second axis 16. The frame 15 has counterweights 15A to balance the weight of the reflector 13. The antenna is driven in elevation about the second axis 16 by a motor (not shown) having a pulley 17 linked by a belt 18 to a further pulley 19, the latter being fixed to the shaft 15. The motor is controlled by a signal on line 20. A potentiometer device (not shown), similar to that used to produce the azimuth signal on line 12, produces a signal on line 21 indicating the current elevation of the antenna.

The arms 1A and 1B of the platform carry U-shaped brackets 22 (FIG. 2) between the arms of which rotor assemblies 23 and 24 are pivotted. They are pivotted in bearings 25 about the orthogonal fourth and fifth axes 26 and 27 respectively.

Figure 2:
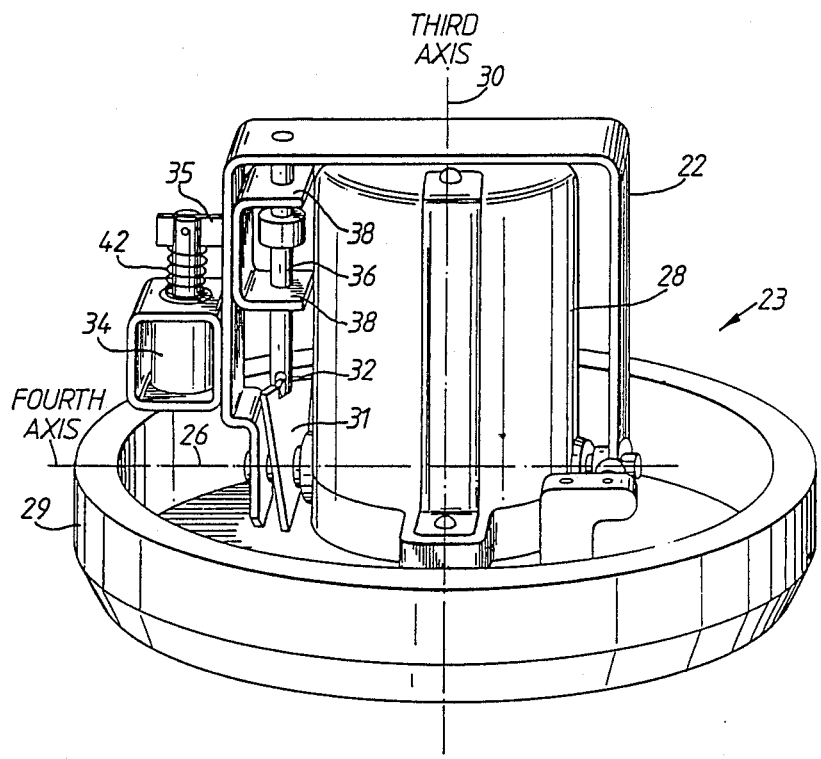
FIG. 2 is a detailed view of one of the two rotors also shown FIGS. 1 and 1A.

FIG. 2 shows one rotor assembly 23 mounted in its bracket 22. The other rotor assembly 24 is identical except for the direction of rotation of the rotor and it will therefore not be described in detail. The assembly 23 comprises a motor 28 which drives a rotor 29 about an axis 30 which is the "third axes" referred to in the claims. The motor has, attached to it, a detent plate 31 (FIG. 3) having an edge 32 with a notch 33.

Figure 3:
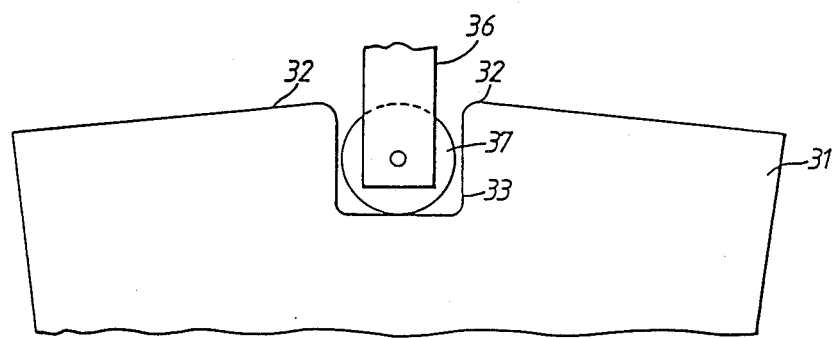
FIG. 3 is a yet more detailed view of a detent mechanism also shown in FIG. 2.

Fixed to the bracket 22 is a solenoid assembly 34 which is connected by a link 35 passing through a slot in the bracket 22 to a slider 36 carrying a roller 37 (FIG. 3) and guided by bearing in a bracket 38. In FIGS. 2 and 3 the slider 36 is shown in a position such that the roller 37 has entered the notch 33.

In operation the solenoid 34 is de-activated so that the rotor assembly 23 is able to pivot about the fourth axis 26 thereby providing the required stabilising effect.

A control system 39 (FIG. 1) controls the azimuth and elevation motors by signals on lines 41 and 20 to track the satellite, the current azimuth and elevation of the antenna being fed back to the control system 39 on lines 12 and 21.

The lines 12,20,21,40 and 41 pass through: a hollow vertical shaft forming the first axis, through universal joint 2, through shaft 3, and through pedestal 4 to the control system. A microwave link ML from an antenna feed horn (not shown) passes along the same path as do electrical links L1 and L2 which supply power to the rotor motors. When the signal on line 12 indicates that the antenna azimuth is displaced by 210° from a centre position where the electrical links between the antenna and the ship have no twist, the following sequence of events occurs under the control of the control system 39.

1. The control system 39 monitors communications traffic and sea state and selects a suitable time for rewinding having regard to the desirability of avoiding periods when there is a heavy flow of communications traffic and when the sea is rough. It is to be noted that, in this particular system, a further 60° of rotation in azimuth can take place before the platform 1A,1B,1C is prevented, by end stops, from further rotation which would otherwise cause undue twisting of the electrical links. The control system 39 is designed to ensure that a suitable time is chosen for rewind before that final limit is reached.

2. When a suitable time for rewind has been selected a signal is produced on line 40 to energise the solenoid 34 thus urging the roller 37 of the slider 36 into contact with the edge 32 of the detent plate 31.

3. The control system 39 then waits for a preset time interval of sufficient length to ensure that the movement of the ship will have caused the notch 33 to present itself to the roller 37: whereupon the roller 37 will drop into the notch 33 under the action of the solenoid 34.

4. After the preset time interval a signal is generated on line 41 to drive the antenna rapidly through 360° and then to stop.

The solenoid is then de-energised and, under the action of spring 42, the roller is removed from the slot to allow the rotors to resume their normal stabilising action.

I claim:

1. A stabilized mount comprising: a platform; an antenna; a universal joint by which the platform is adapted to be mounted on a vehicle; means allowing the platform to be rotated about a first axis relative to the vehicle and antenna to be rotated about a second axis relative to the platform so that the antenna is adjustable in azimuth and elevation; stabilization rotors which rotate about third axes are mounted on the platform in a manner such that they are allowed to pivot about fourth and fifth orthogonal axes; means for detecting when the platform has rotated about the first axis relative to the vehicle to a certain limit; and for each rotor, locking means which comprises a detent mechanism comprising a locking member and a detent, for responding to such detection by activating said detent locking member, and subsequently allowing free rotation of the gyro about its fourth or fifth axes until the locking member is aligned with the detent, and subsequently allowing the locking member to engage with the detent to lock the position of rotation of the gyro about its fourth or fifth axis when its third axis becomes parallel to the first.

2. A stabilized mount according to claim 1 comprising means for rewinding the platform through 360° about the first axis in response to a said detection.

* * * * *